March 18, 1924.
W. ROHRBACH
BIRD NEST
Filed Jan. 5, 1923
1,487,268
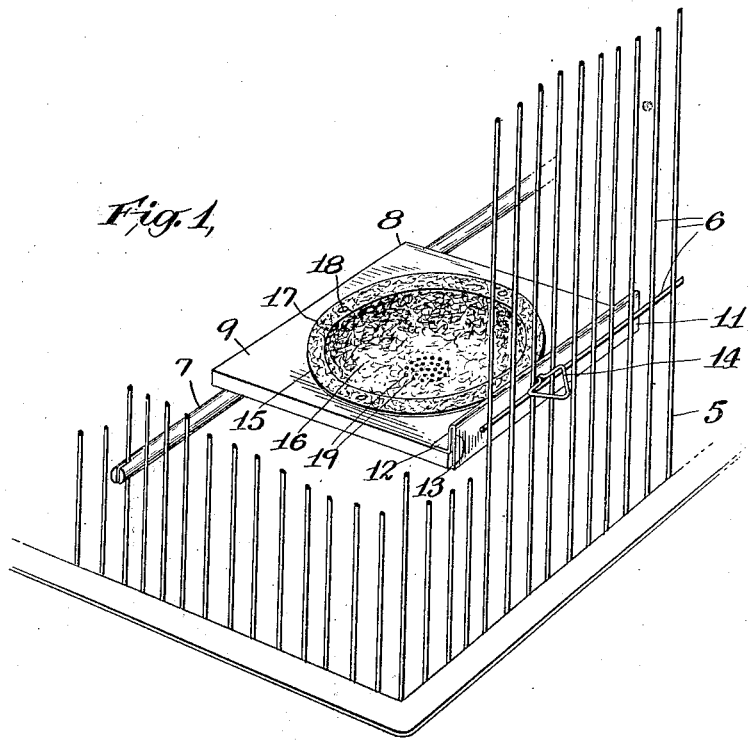
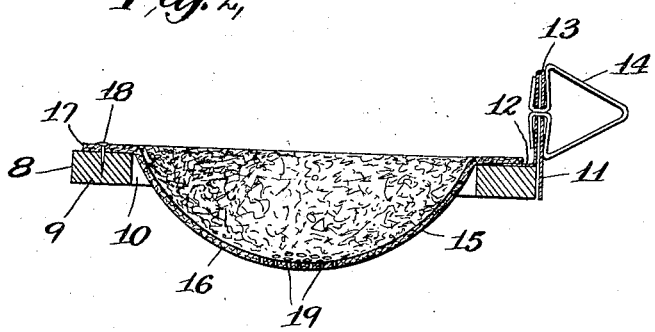
Inventor
William Rohrbach
By his Attorneys
Edgar Date & Co Patented Mar. 18, 1924.

1,487,268

UNITED STATES PATENT OFFICE.

WILLIAM ROHRBACH, OF GLENDALE, NEW YORK.

BIRD NEST.

Application filed January 3, 1923. Serial No. 610,403.

*To all whom it may concern:*

Be it known that I, WILLIAM ROHRBACH, a citizen of the United States, and residing at Glendale, in the county of Queens and State of New York, have invented certain new and useful Improvements in Bird Nests, of which the following is a specification, such as will enable those skilled in the art to which it appertains to make and use the same.

This invention relates to bird nests and particularly to devices of this class designed to be mounted in connection with bird cages and the like and to be used in the breeding of birds of various kinds and particularly canaries; and the object of the invention is to provide a nest of the class and for the purpose specified which is simple in construction and efficient in use and which may be readily attached and detached from a suitable support; a further object being to provide improved means for ventilating nests of the class specified, whereby the hatching of eggs is more efficiently accomplished; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part in which the separate parts of my improvement are designated by suitable reference characters in each of the views, and in which:—

Fig. 1 is a perspective view of a part of a bird cage showing my improved nest mounted in connection therewith; and, Fig. 2 is a transverse section through the nest shown in Fig. 1, detached.

In Fig. 1 I have shown for the purpose of illustrating the use of my invention a part of a bird cage 5, the body of which is composed of wire strands 6 arranged vertically and horizontally and mounted in the cage is a transverse rod 7 composed of wood or other material and which forms a perching rod for the bird within the cage and at 8 is shown one of my improved bird nests.

My improved bird nest in the construction shown comprises a substantially rectangular frame or platform 9 having a central circular aperture 10 and to one side edge of the frame 9 is secured a metallic strip 11, one part 12 of which rests upon the top face of the platform or frame 9 and is secured thereto, and said strip is bent upwardly and downwardly to form an attaching flange 13 centrally of which is movably mounted an attaching member 14, which when in the position shown in Fig. 2 is adapted to be passed between two of the vertical wires of a cage and then turned at right angles to engage two of such wires to retain the nest against displacement in the cage in the manner illustrated in Fig. 1.

I also employ a nest forming member 15 which is composed of fibrous material preferably from felt and is fashioned to form a semi-circular body 16 having a flange 17 which rests upon the top face of the frame or platform 9 and is secured thereto by tacks or the like 18, and the semi-circular body extends downwardly through the aperture 10 in the frame or platform 9 as clearly shown in Fig. 2 of the drawing. Centrally of the semicircular body 16 of the nest 15 are formed a plurality of small apertures 19 which serve, in the use of my improved device, as vents for ventilating the nest.

It has been found in practice that with nests of the class under consideration which have been closed at the bottom and having no means for ventilation, that the hatching of eggs has been materially affected and has also resulted at times in causing sickness to the bird due to the fact that the heating properties of the nest would cause the bird to perspire while setting upon the eggs. It is also a well known fact that the eggs to be hatched require a certain amount of ventilation and the provision of the apertures 19 at the bottom of the nest formed by the fibrous body will provide the required ventilation and will also prevent the bird from perspiring or becoming overheated, and this is one of the distinctive features of my invention.

My improved nest by reason of the simplicity of its construction may also be produced to sell at a reasonable price and it will be understood that while I have shown and described certain details of construction that I am not necessarily limited to the specific construction herein shown and described, and various changes therein and modifications thereof may be made within the scope of the appended claims without departing from the spirit of my invention or sacrificing its advantages.

It will be understood that the platform or frame 9 is preferably composed of non-metallic material, such for example as wood, fibre or the like, the object being to make the entire device as light as possible and also to provide a desirable platform on which the bird may perch if desired.

Having fully described my invention, what I claim as new and desire to secure by Letters Patent, is:—

1. A nest of the class described comprising a rectangular frame of non-metallic material and provided with a central circular aperture, a cup-shaped body of fibrous material mounted in connection with said frame and extending downwardly into the aperture thereof and forming the nest proper and a metallic strip mounted in connection with the frame and an attaching device movably mounted in connection with said strip.

2. A nest of the class described comprising a rectangular frame of non-metallic material and provided with a central circular aperture, a cup-shaped body of fibrous material mounted in connection with said frame and extending downwardly into the aperture thereof and forming the nest proper and a metallic strip mounted in connection with the frame, an attaching device movably mounted in connection with said strip, said strip being fashioned to form a part which rests on and is secured to the frame, and a part which extends upwardly at an angle to the plane of said frame.

3. A nest of the class described comprising a frame having a substantially circular aperture, a fibrous body mounted in connection with said frame and extending into said aperture and fashioned to substantially cup-shaped formation to form the nest proper, the periphery of said body being secured to said frame, said fibrous body or the cup-shaped portion thereof being provided centrally with a plurality of small apertures located centrally of the bottom thereof to provide ventilation to the nest, a metal reinforcing strip mounted in connection with one side of the frame, means on said strip for securing said nest in connection with a suitable support, said strip being fashioned to form a flange which extends at an angle to the plane of said frame, and said securing means being rotatably mounted in connection with said strip.

In testimony that I claim the foregoing as my invention I have signed my name this 30th day of Dec., 1922.

WILLIAM ROHRBACH.